United States Patent
Focke et al.

US 6,718,727 B2
Apr. 13, 2004

(54) ARRANGEMENT FOR SUPPLYING PACKAGING MACHINES WITH PACKAGING MATERIAL

(75) Inventors: Heinz Focke, Verden (DE); Irmin Steinkamp, Seevetal (DE); Frank Hill, Achim (DE); Holger Pfeiffer, Riede/Felde (DE)

(73) Assignee: Focke & Co. (GmbH & Co.), Verden (DE)

( * ) Notice: Subject to any disclaimer, the term of this patent is extended or adjusted under 35 U.S.C. 154(b) by 0 days.

(21) Appl. No.: 10/074,999

(22) Filed: Feb. 13, 2002

(65) Prior Publication Data

US 2002/0162299 A1 Nov. 7, 2002

(30) Foreign Application Priority Data

Feb. 27, 2001 (DE) .......................... 101 09 446
Oct. 25, 2001 (DE) .......................... 101 52 048

(51) Int. Cl.⁷ ............................................. B65B 19/18
(52) U.S. Cl. ..................... 53/168; 53/202; 198/347.1; 198/348
(58) Field of Search ................ 53/168, 148, 202, 53/154, 167; 131/283; 198/347.1, 348, 349

(56) References Cited

U.S. PATENT DOCUMENTS

| 5,474,251 A | * | 12/1995 | Neri | 242/554.2 |
| 5,601,252 A | * | 2/1997 | Draghetti | 242/559.1 |
| 5,608,818 A | * | 3/1997 | Chini et al. | 382/153 |
| 5,617,701 A | * | 4/1997 | Brizzi et al. | 53/168 |
| 5,628,162 A | * | 5/1997 | Kreusch et al. | 53/168 |
| 5,653,087 A | * | 8/1997 | Spada et al. | 53/168 |
| 6,516,811 B1 | * | 2/2003 | Focke et al. | 131/283 |

FOREIGN PATENT DOCUMENTS

| DE | 29 49 745 A1 | 7/1980 |
| DE | 34 08 171 A1 | 10/1985 |
| DE | 31 51 316 C2 | 9/1986 |
| DE | 36 15 309 A1 | 11/1986 |
| DE | 35 26 524 A1 | 2/1987 |
| DE | 35 19 580 C1 | 3/1987 |
| DE | 36 27 670 C1 | 3/1988 |
| DE | 42 25 337 A1 | 2/1994 |
| DE | 42 15 739 C2 | 11/1995 |
| DE | 195 31 522 A1 | 2/1997 |
| DE | 40 18 266 C2 | 10/1997 |

OTHER PUBLICATIONS

Copy of Search Report from German Patent Office on priority patent application.

* cited by examiner

Primary Examiner—Eugene Lee Kim
(74) Attorney, Agent, or Firm—Technoprop Colton LLC

(57) ABSTRACT

For supplying production and packaging machines, in particular for supplying lines (10, 11) for producing and packaging cigarettes, an intermediate store (12) is provided for storing packaging material, to be precise for pallets (20) with reels (18) of web-like material. Pallets (20) with the packaging material are fed to the intermediate store (12) by a pallet conveyor (28). A separate reel conveyor (48) transports reels (18), as required, to the individual machines and subassemblies of the lines (10, 11).

16 Claims, 8 Drawing Sheets

Fig.3

ARRANGEMENT FOR SUPPLYING PACKAGING MACHINES WITH PACKAGING MATERIAL

BACKGROUND OF THE INVENTION

1. Technical Field

The invention relates to an arrangement for supplying production and packaging machines with expendable material or packaging material, in particular as wound material webs—reels—which are supplied on pallets and distributed (individually) to the production and packaging machines.

2. Prior Art

The task of supplying high-performance machines in the cigarette industry poses a particular problem. The problem concerns feeding material to machines for producing and packaging cigarettes or similar products. The material which is used predominantly is web-like material which is available in wound form, namely as a reel.

Known arrangements operate with industrial trucks, that is to say with transporting vehicles which travel along the floor of a production plant and deliver reels arranged on pallets to the individual packaging machines. However, arrangements for transporting reels from a central material store to the individual use locations by way of an overhead conveyor which is set up for automatic operation are also already known.

BRIEF SUMMARY OF THE INVENTION

The object of the invention is to propose a high-performance arrangement for supplying packaging and production machines, in particular with reels, which is particularly cost-effective to construct and operate.

In order to achieve this object, the arrangement according to the invention is characterized by the following features:

a) a machine or a unit containing a plurality of machines, in particular comprising two lines for producing and packaging cigarettes, is assigned an adjacent intermediate store for packaging material or reels, b) located in the intermediate store is at least one pallet for (each type of) (web-like) material processed in the machine or machines, c) pallets with in each case one type of reel can be fed to the intermediate store by a pallet conveyor, d) individual reels can be transported, by a separate reel conveyor, from the intermediate store to one of the machines which is to be supplied.

An essential basic idea of the invention is that, for different transporting tasks within a production and packaging installation, use is made of different transporting systems which are custom-made for the respective task. Within the context of the invention, arranged in the region of the (intermediate) store for the reels is a conveyor of which the operating region is restricted to the material store but which is set up for automatic operation and has, in particular, a lifting head for the reels which, with the aid of suitable sensors, automatically selects—with reference to identification features—the reel which is to be transported further, automatically grips the reel and makes it available for being received by the reel conveyor. This conveyor is, in particular, a portal robot. The reel conveyor, in contrast, is set up as a "straightforward conveyor", namely as an overhead conveyor with a straightforward traveling mechanism and lifting mechanism. This reel conveyor is provided with a lifting head which can simply be moved up and down. For satisfactory functioning of the same, the reels are deposited by the portal robot on a receiving means in each case in the region of the material store, the receiving means assuming a precise position relative to the movement path of the reel conveyor. Also provided in the region of the material-consuming machine is a set-down position, which is likewise located precisely in the movement region of the reel conveyor.

The configuration of the (intermediate) store with pallets for reels of any type which is to be processed and with a special pallet conveyor, namely pallet carriage, constitutes a further special feature. The intermediate store has a transfer station, in the region of which the reel conveyor and a conveyor for transporting the pallets up and away—pallet conveyor—run.

Further features of the invention relate to the configuration of the intermediate store and the conveyors for reels or pallets.

Further details of the invention are explained more specifically hereinbelow with reference to an exemplary embodiment of an installation for producing and packaging cigarettes.

BRIEF DESCRIPTION OF THE DRAWINGS

Figure 3:
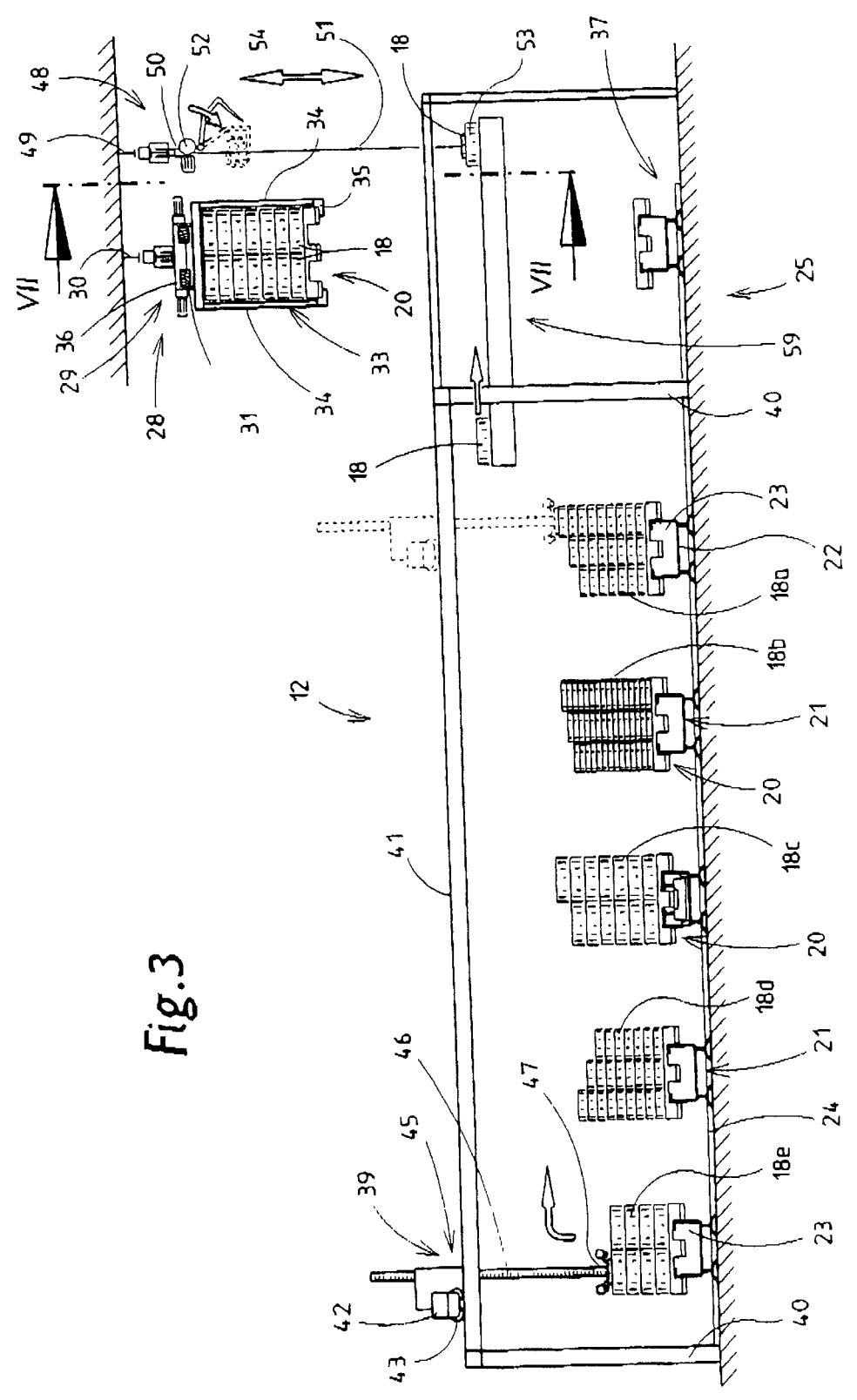

FIG. 3 shows the intermediate store in a side view in accordance with arrow III in FIG. 2.

DETAILED DESCRIPTION OF THE PREFERRED EMBODIMENTS

Figure 1:
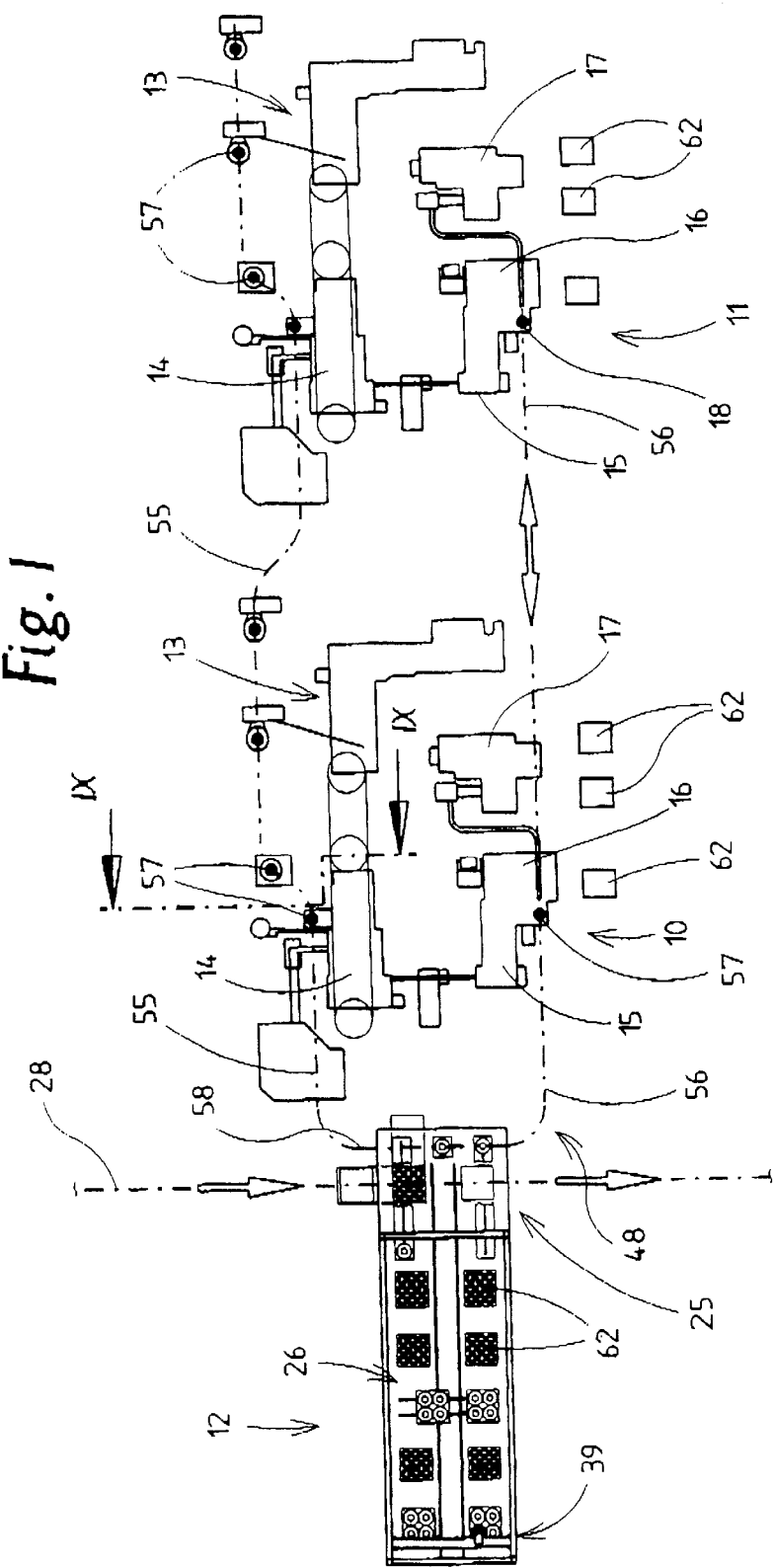
FIG. 1 shows a schematic plan view of a machine unit with intermediate store.

The drawings show the production and packaging of cigarettes. An arrangement or unit which is shown schematically in FIG. 1 comprises a plurality of machine groups, namely two lines 10, 11 which are assigned to a common supply or intermediate store 12 for production and packaging material. A line 10, 11, in turn, comprises a cigarette-production machine, that is to say a maker 13, and a packaging machine for cigarette packs, that is to say a packer 14, and also a packaging machine for the outer wrapper of cigarette packs, namely a cellophane packer 15 in conjunction with a multipacker 16, as well as an adjoining carton packer 17.

The intermediate store 12 contains the packaging material required for the (two) lines 10, 11, that is to say when it is wound, web-like material which is present in the form of reels 18. The reels 18 have a central opening 19, which is usually formed by a cylindrical reel core. The reels 18 differ in terms of diameter and axial length, namely depending on the material.

The intermediate store 12 is designed as an elongate, rectangular area. The reels 18 are stored, to be precise on pallets 20, in a state in which they have been sorted into groups. Each pallet 20 exclusively receives packaging material of one type, in a plurality of layers one above the other, such that at least one pallet of each type of packaging material is present in the intermediate store 12. By way of these pallets 20, the reels 18 are set down in precisely predetermined positions within the intermediate store 12. For this purpose, load-bearing apparatuses supported on the floor, namely rests 21, are provided for in each case one pallet 20. In the exemplary embodiment according to FIG. 2, ten rests 21 are set up in two rows of five rests 21 in each case. These comprise a base wall 22 with supporting elements on the underside. (Two) cross-sectionally U-shaped crosspieces 23 are fitted on two mutually opposite sides of the base wall 22—transversely to the longitudinal extent of the intermediate store 12. These crosspieces form the support for the pallets 20 resting on the rests 21, the pallets, on account of the dimensions of the rests 21, engaging around the rest 21 by way of the customary lateral profile bars (FIG. 3).

In the intermediate store 12, the processing and packaging materials are positioned such that cellophane reels 18a for outer wrappers of the packs are positioned on two first pallets 20. Adjacent to these are tin-foil reels 18b for the inner wrapper of a cigarette pack, collar reels 18c are stored on the next-following pallets 20 for producing collars as part of a cigarette pack of the hinge-lid-box type, and then filter-paper reels 18d and cigarette-paper reels 18e are stored on two pallets 20 in each case. The two last-mentioned materials, namely filter paper and cigarette paper, are used for producing the cigarettes in the region of the maker 13.

Figure 4:
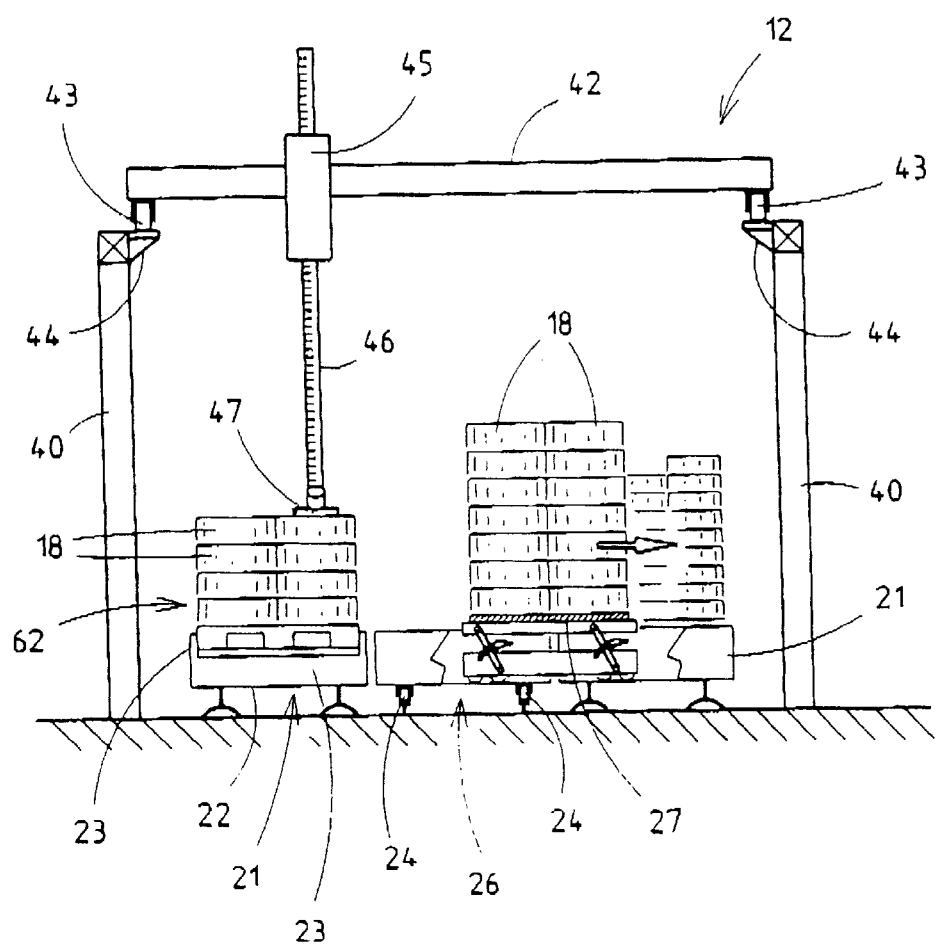
FIG. 4 shows a cross section or a transverse view of the intermediate store along a plane IV-IV from FIG. 2.

The pallets 20 and/or rests 21, which are assigned to the material in pairs, are arranged on both sides of a conveying path for pallets 20 which is formed (centrally) within the intermediate store 12. This path comprises two floor rails 24. On these rails, a transporting vehicle for pallets 20 can be displaced over the entire length of the intermediate store 12 into the region of a transfer station 25, in which pallets 20 and reels 18 are supplied and conveyed away. The vehicle is a pallet carriage 26, which is displaced on the rails 24. The pallet carriage 26 receives (loaded) pallets in the region of the transfer station 25, moves these into the region of an empty rest 21 and sets down the relevant pallet 20 on said rest 21. For this purpose, the pallet carriage 26 is equipped with a transverse conveying apparatus. This is constituted by two lifting rails 27 which rest within the profile of the pallet carriage 26 in a starting position and can be moved upwards, in the present case by parallelogram supports (FIG. 4), in order to raise the pallet 20. The lifting rails 27, furthermore, are fitted on a traveling mechanism which can be displaced in the transverse direction on the pallet carriage 26 and can be moved into the rest 21, designed with a corresponding profile. In the end position, said lifting/traveling mechanism is located in the region of the rest 21. By virtue of the lifting rails 27 being lowered, the pallet is set down in a precise position on the relevant rest 21. The lifting mechanism is then moved back into the pallet carriage 26.

In the region of the transfer station 25, loaded pallets 20 are supplied—within the intermediate store 12 depending on requirements—transferred to the pallet carriage 26 and set down at the associated position in the region of the intermediate store 12. Furthermore, empty pallets 20 are conveyed away. Provided for transporting the pallets 20 is a pallet conveyor 28 which is designed as an overhead conveyor and is guided through the transfer station 25 transversely to the alignment of the intermediate store 12. The pallet conveyor 28 transports loaded pallets 20 from a central store (not shown) to the intermediate store 12 and/or to the transfer station 25. Empty pallets 20 are transported back to the central store by the pallet conveyor 28.

Figure 6:
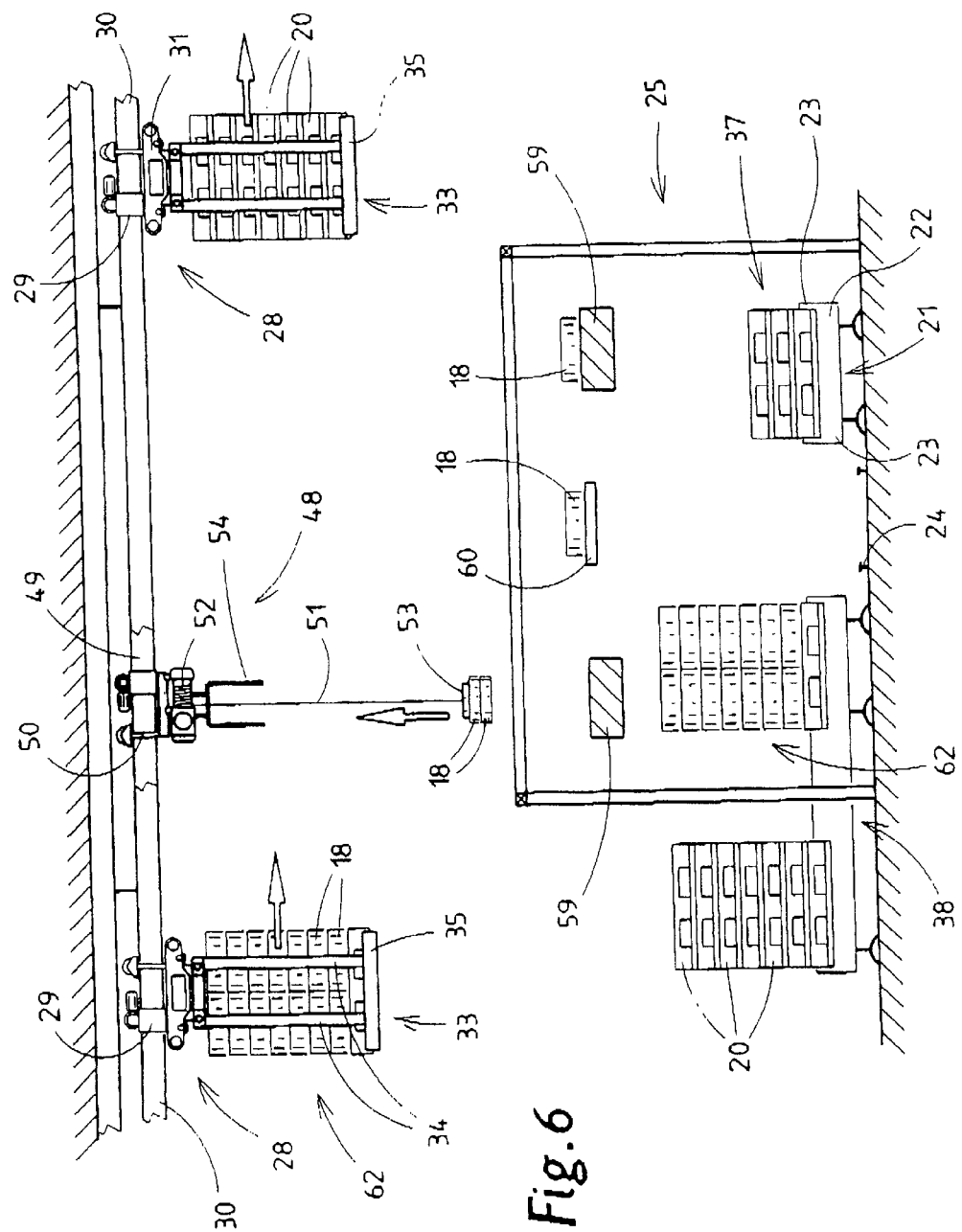
FIG. 6 shows an illustration or view similar to FIG. 5, with a view of a reel conveyor.
Figure 7:
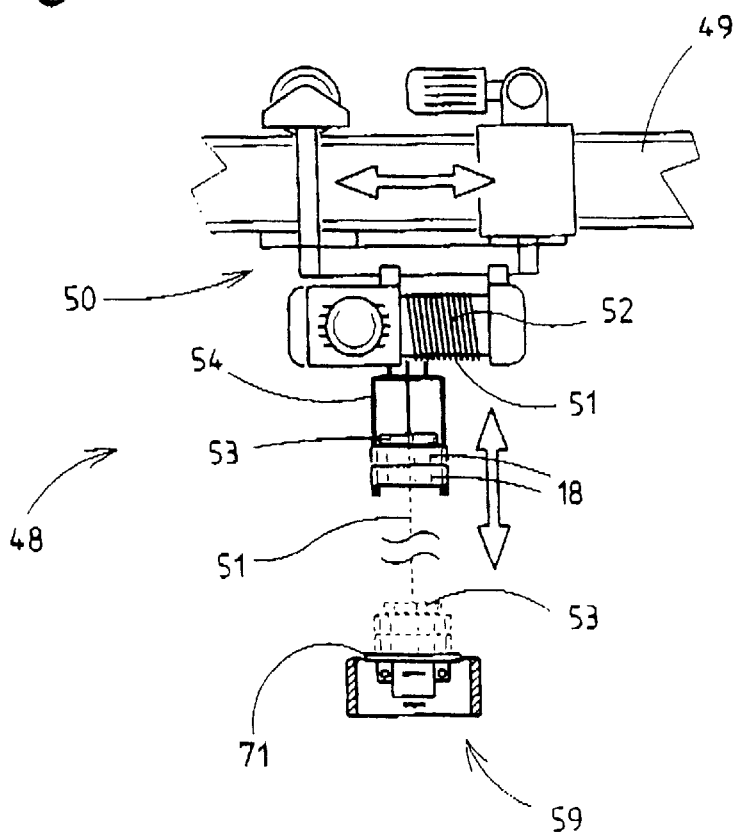
FIG. 7 shows a side view of a detail of an overhead conveyor, namely of the reel conveyor.

The pallet conveyor 28 preferably comprises a plurality of traveling carriages 29 which can be displaced on an elevated running rail 30. Wherever possible in design terms, the running rail 30 is installed as a ceiling rail. The pallet conveyor 28 may, in principle, be designed conventionally as a delpher system. Fitted on the traveling carriage 29 is a lifting mechanism 31 with traction elements, in particular traction cables 32. Fitted on these is a securing means 33 for receiving a pallet 20. The securing means 33 here comprises two upright load-bearing struts 34 with bottom load-bearing elements, namely load-bearing legs 35, which grip the border of a pallet 20 at the bottom, to be precise in the region of continuous load-bearing parts of the pallet 20. The securing means 33 is connected to the two traction cables 32. These, in turn, are moved up and down by lifting elements, namely winches 36. The securing means 33 is designed to receive a pallet 20 loaded with a plurality of reels or alternatively a stack of empty pallets 20 (FIG. 6, right-hand side).

Figure 5:
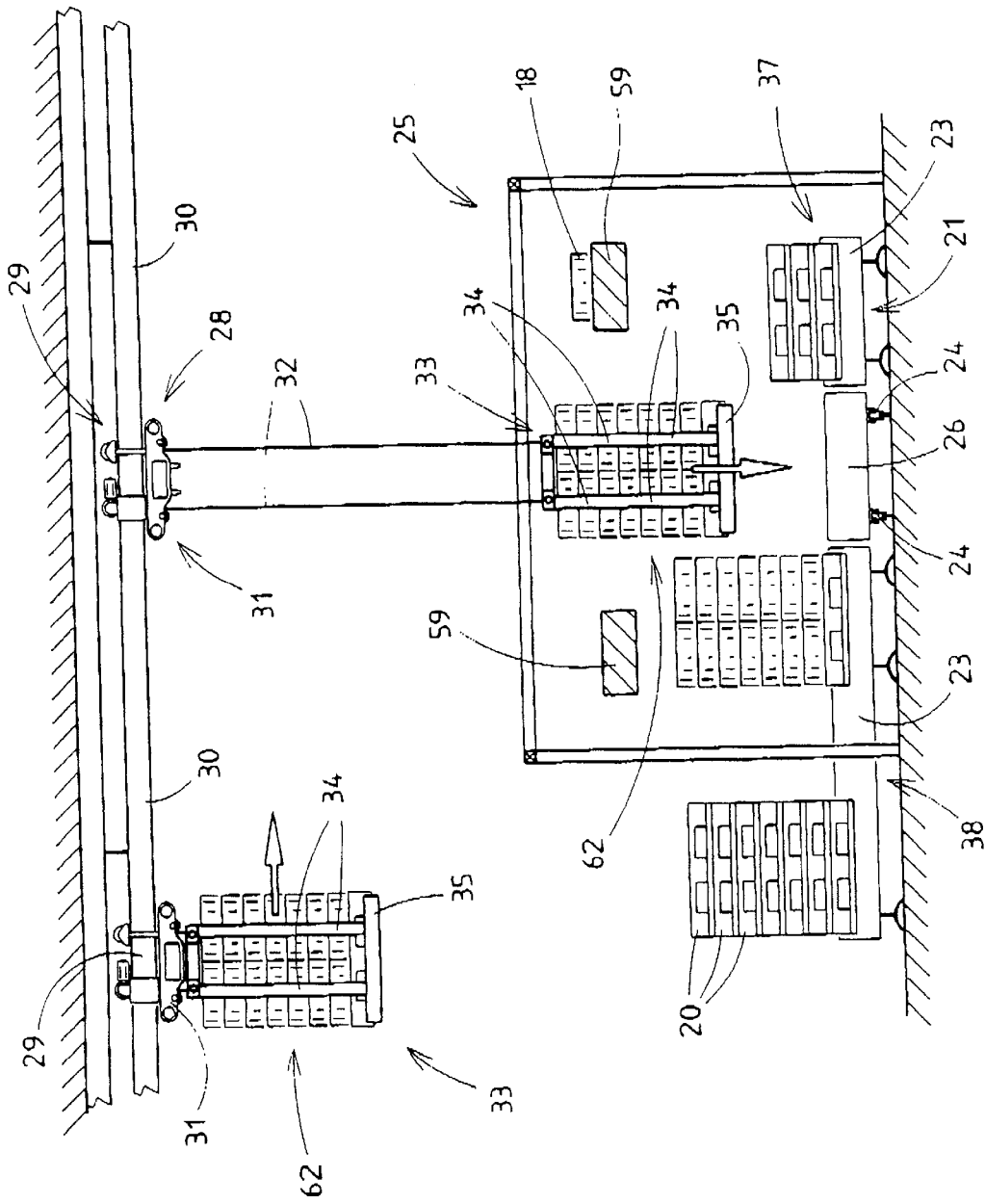
FIG. 5 shows a cross section of the intermediate store with a region directed toward the pallet conveyor, along section plane V-V.

A (new) loaded pallet 20 is set down by the pallet conveyor 28 on a pallet carriage 26 positioned precisely beneath the pallet conveyor 28 (FIG. 5). The securing means 33 is released from the pallet 20, by virtue of the load-bearing legs 35 being moved apart from one another, and is moved upward. The pallet 20 is then fed to the envisaged (empty) position by the pallet carriage 26.

Empty pallets 20 are collected, that is to say stacked and conveyed away in appropriate numbers. In the region of the transfer station 25, alongside the movement path of the pallet carriage 26, an intermediate store 37 is set up for empty pallets 20. This is constituted by one of the above described rests 21 for pallets 20.

Individual reels 18 are transported to the machines and subassemblies of the lines 10,11 by separate conveyors. Provided in the region of the intermediate store 12 is an automatic reel conveyor, namely a portal robot 39 which receives individual, if appropriate a plurality of, reels 18 from the pallets 20 as required and positions them for being received by a reel conveyor and/or conveys them into the region of the transfer station 25. For the portal robot 39, the intermediate store is arranged within a load-bearing structure which comprises (four) upright supports 40 and two lateral load-bearing members 41. The latter serve, at the same time, as load-bearing means for the portal robot 39. A cross member 42 extends transversely above the intermediate store 12 and can be displaced in the longitudinal direction of the same by the portal robot 39. The cross member can be displaced by way of rollers 43 on the load-bearing members 41 and/or on brackets 44. A lifting unit 45, in turn, can be displaced in the longitudinal direction of the cross member 42, that is to say in the transverse direction of the intermediate store 12, with the result that, on the one hand, the ability of the cross member 42 to move and, on the other hand, the ability of the lifting unit 45 to move transversely on the cross member 42 make it possible to cover every region of the intermediate store 12.

A lifting means which can be moved up and down, in the present case a rack 46, is fitted on the lifting unit 45. A lifting head 47 is located at the bottom end of said rack. Said lifting head is designed with an arrangement for gripping a reel 18, in particular with a supporting pin, which passes into the central opening 19 and is anchored there. The portal robot 39, and in particular the lifting head 47, is set up for automatic operation such that, as required, the requested reels on the pallets are detected, gripped and transported further. For this purpose, the lifting head 47 has sensors for sensing identification features of the reels 18 and for introducing the supporting pin into the central opening 19. In the present example (FIG. 8), (two) mutually opposite laser sensors 65 are arranged on the lifting head 47 and control and/or guide the portal robot 39 and the lifting head 47 via a central control unit.

In accordance with requirements, the portal robot 39 is moved under control to a pallet 20 with the required packaging material and a reel 18 on this pallet 20 is gripped by the lifting head 47. By upward movement of the rack 46, the reel 18 is raised and, by displacement of the cross member 42, then conveyed into the region of the transfer station 25.

A separate conveyor, namely a straightforward reel conveyor 48, is provided for transporting the reel to the line 10, 11. Said reel conveyor is designed as an overhead conveyor with a running rail 49 which is raised and/or arranged on a ceiling. A traveling mechanism 50 can be displaced on said running rail 49 and is equipped with a lifting mechanism for a traction element, namely for a lifting cable 51. The lifting mechanism here comprises a winch 52.

A reel carrier 53 is fitted on the lifting element, namely on the lifting cable 51. The reel carrier grips a reel 18 (or a plurality of reels arranged one above the other) by virtue of a retaining element, namely of a supporting pin, passing into the central opening 19. During transportation along the running rail 49, the reel 18 is fixed on the reel carrier 53 by an additional element, namely by a securing lever 54 which is fitted pivotably on the traveling mechanism 50 and butts against the underside of the reel 18 by way of a bottom, horizontal leg.

Figure 9:
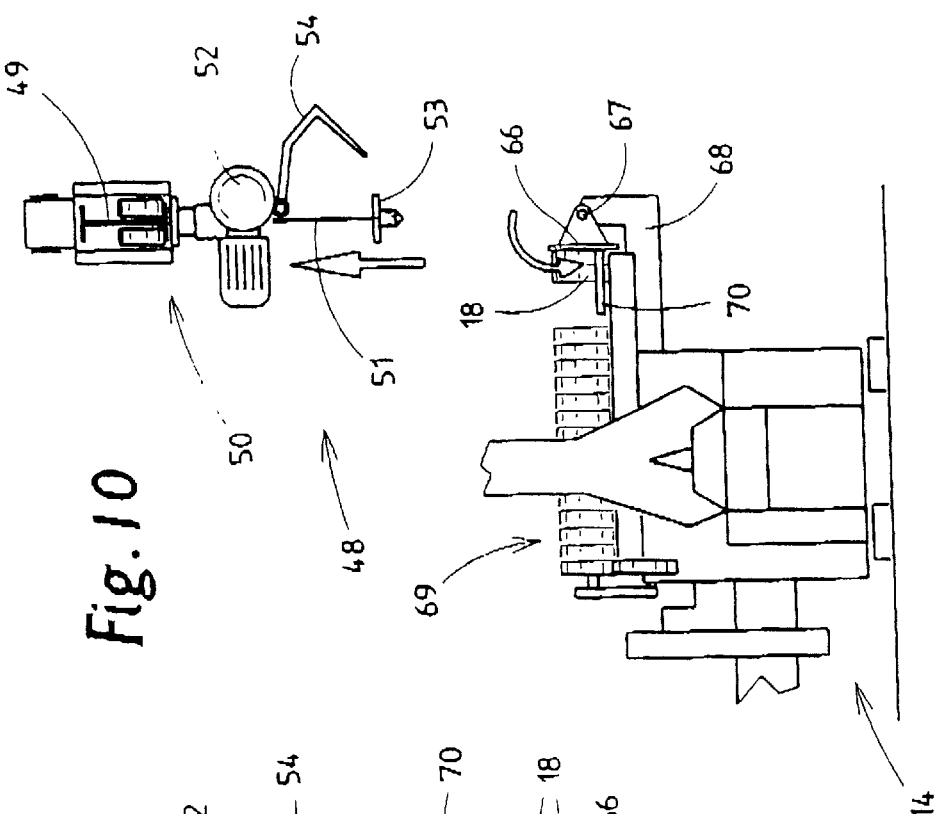
FIG. 9 shows a transverse view of a detail in the region of a packaging machine with reel conveyor pursuant to section plane IX-IX in FIG. 1.
Figure 10:
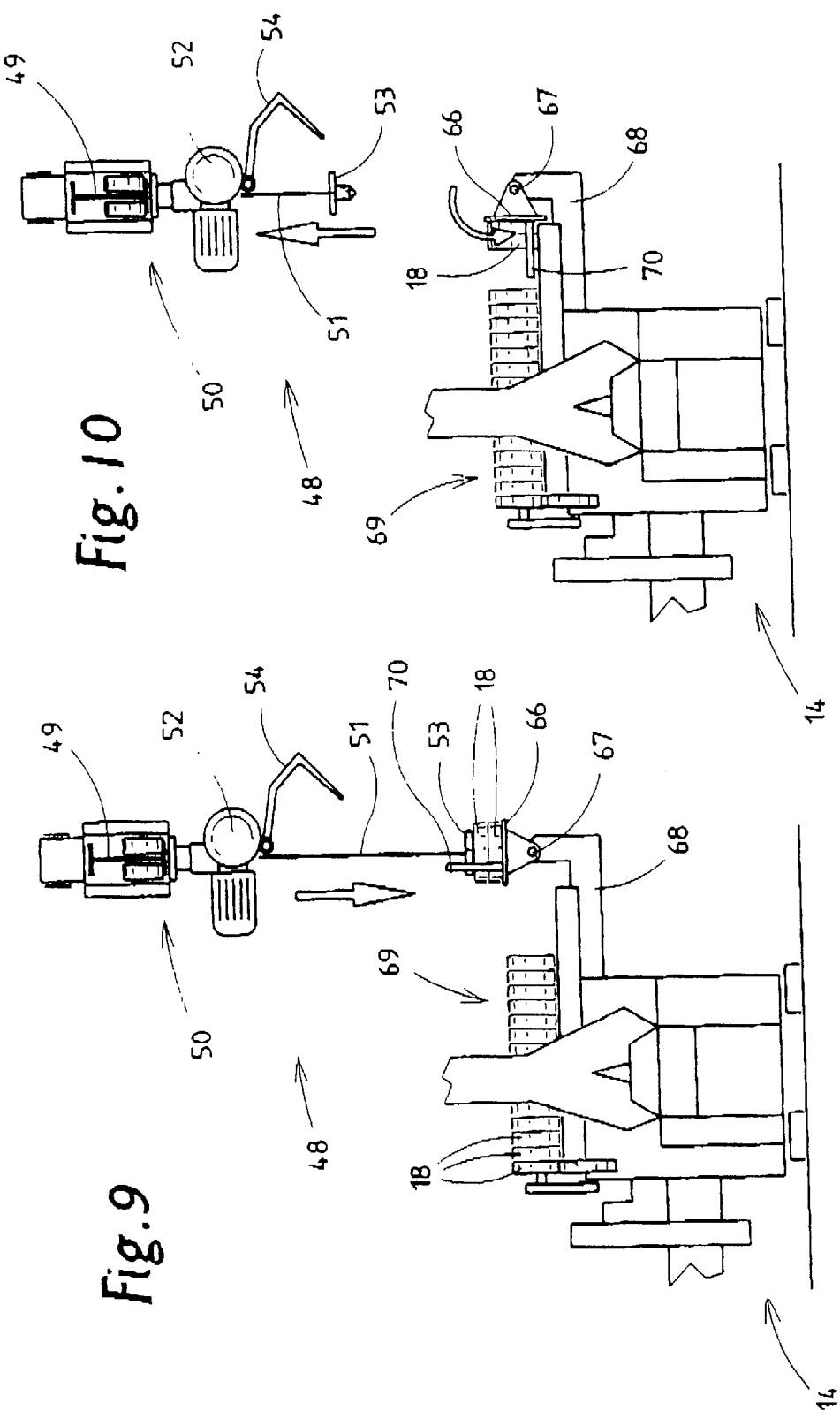
FIG. 10 shows an illustration analogous to FIG. 9 once a reel has been deposited by the reel conveyor.

In the present exemplary embodiment, the reel conveyor 48 is designed as an open-ended conveyor. Two conveying sections 55, 56 extend on both sides of the lines 10, 11, above the same, to be precise in a position above predetermined depositing locations 57 for the reels 18. The depositing locations 57 are selected such that it is possible for the reels 18 either to be received directly by a subassembly of the machines or to be transported to the relevant subassembly by a reel conveyor of the machine. In the example in FIGS. 9 and 10, a set-down panel 66 is fitted on a machine-packer 14, to be precise as an exact depositing location for the reel 18. The set-down panel 66, which is aligned horizontally in the starting position, can be tilted via a bearing 67 on an angled load-bearing arm 68. By virtue of tilting, the reel 18 passes into an upright position—with the central opening 19 horizontal. In this position, the reel 18 is fed to a reel magazine 69 of the machine. The set-down panel 66 has retaining elements, namely at least two upright supporting bars 70. These support the reel 18 on the circumference during the tilting movement.

The reel conveyor 48 and the traveling mechanisms 50 are displaced in both directions of the conveying sections 55, 56, that is to say in the conveying direction and the return direction. In the region of the transfer station 25, the conveying sections 55, 56 are connected to one another by a transverse section 58. This runs parallel to the pallet conveyor 28.

The handling of the reels 18 for being received by the reel conveyor 48 is regulated in a particular manner. This is because the reels 18 are deposited by the portal robot 39 on an intermediate conveyor 59 which is fitted above the movement paths of pallets 20 within the intermediate store 12, that is to say in a considerably elevated manner. In the example shown, two parallel intermediate conveyors 59 are provided, these extending, by way of a receiving end, into the region of the intermediate store 12, in any case into the operating region of the portal robot 39. The latter deposits a received reel 18 at the facing end of one intermediate conveyor 59 or the other. The relevant reel 18 is transported into the region of a receiving position (FIG. 3, right-hand side) within the transfer station 25, to be precise exactly beneath the movement path of the reel conveyor 48 and/or in the region of the transverse section 58. By virtue of the lifting head 47 being lowered, it is possible for the reel 18 provided to be gripped (FIG. 3).

The intermediate conveyor or conveyors 59 is/are designed in a particular manner in order to ensure, in particular, precise positioning of the reels 18 for the reel conveyor 48. As can be seen from FIG. 6, the intermediate conveyor 59 is provided with a receiving means for the reel 18, namely with a load-bearing panel 71. The latter has a centrally arranged, upwardly oriented protrusion 72 which passes from beneath into the central opening 19 of the reel 18 deposited. The reel 18 is thus positioned precisely on the load-bearing panel 71 on account of the self-centering action.

Figure 2:
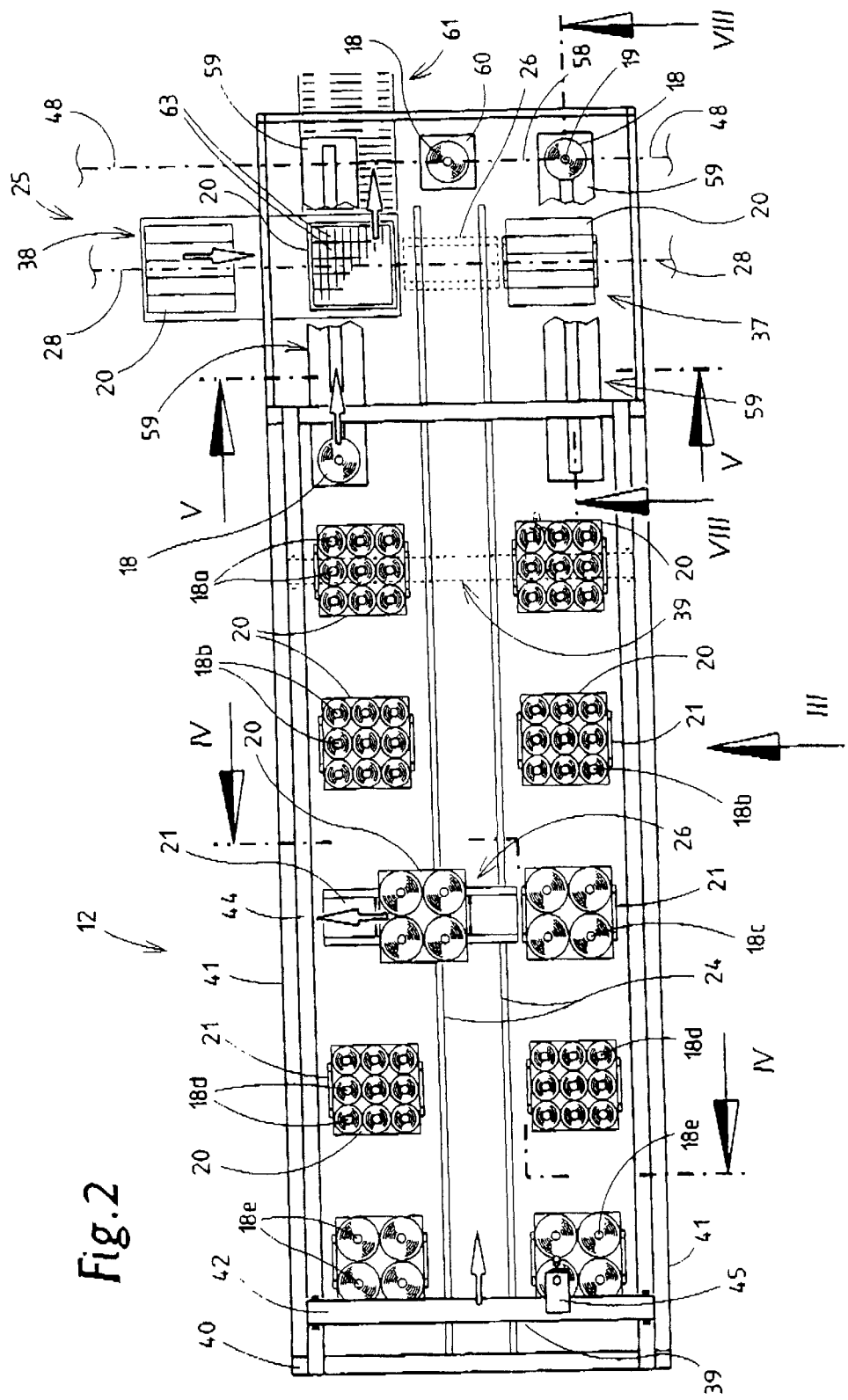
FIG. 2 shows, on an enlarged scale, an intermediate store as part of the arrangement according to FIG. 1.
Figure 8:
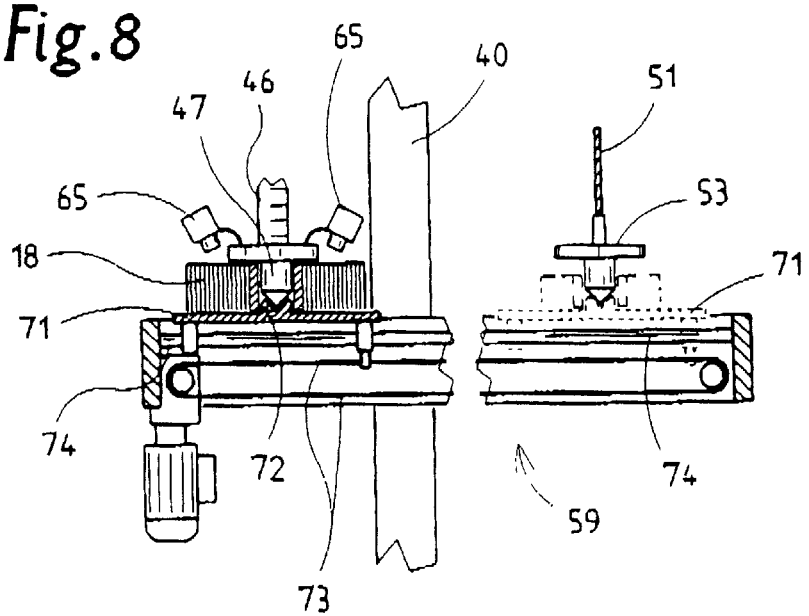
FIG. 8 shows a side view of a detail of the (intermediate) store for reels, namely an intermediate conveyor.

The load-bearing panel 71 can be displaced back and forth on the intermediate conveyor 59 as the transporting element for the reel 18, namely from a receiving position, which is shown on the left in FIG. 2, into a transfer position, illustrated on the right. Provided for the linear movement of the load-bearing panel 71 is a drive, namely a (toothed) belt 73 to which the load-bearing panel 71 is connected. The load-bearing panel 71 is mounted on guides, namely on two parallel guide rods 74, by way of (slide) bearings. FIG. 8 shows, in solid lines, the receiving position for reels 18 and, in dashed lines, the precise transfer position in the operating region of the reel conveyor 48.

A fixed reel platform 60 is located between the two intermediate conveyors 59, namely in extension of the rails 24. Said platform serves for receiving reels 18 which, for example on account of a brief period of machine disruption, cannot be discharged to the associated subassembly by the reel conveyor 48 and thus have to be stored on an intermediate basis. The reel platform 60 is located in the plane of the transverse section 58, with the result that the relevant reel 18 can be received again by the reel conveyor 48 at any time.

For the production of (cigarette) packs, it is possible to use additional or other material which cannot be stored as a reel or which is not expediently provided in the intermediate store 12. This is constituted, in particular, by stacks of pack blanks (made of thin cardboard) which are prefabricated in some other way. These blanks are likewise supplied on pallets 20. In the region of the transfer station 25, an arrangement is provided for handling these particular pallets 20, with the result that they can be transported to the use location directly by an independent conveyor, in particular by a fork-lift truck. FIG. 2 shows, as an example, a pallet 20 with blanks 63 in the region of the transfer station 25. This special type of pallet 20 is likewise supplied by the pallet conveyor 28 and, like each pallet 20, set down on the pallet carriage 26. The latter transfers the (special) pallet 20 to a pallet platform 38, part of which is located within the transfer station 25 and part of which is located outside the same. The relevant pallet with the blanks 63 is pushed off from the pallet platform 38 onto a pallet path 61, for example a roller conveyor, for further processing. The relevant pallet 20 is removed from said roller conveyor by the fork-lift truck and taken to the use location.

Empty pallets are set down by the same conveyor (fork-lift truck) on the pallet platform 38, to be precise outside the transfer station 25 (FIG. 2). The empty pallets are collected, a stack being formed in the process. This stack is then displaced on the pallet platform 38, in the direction of the arrow, into the position within the transfer station 25 and, from there, moved onto the pallet carriage 26 provided. The pallet conveyor 28 can receive the stack of empty pallets from the pallet carriage 26 and transport it away. The same applies analogously for empty pallets 20 collected in the region of the intermediate store 37.

The arrangement which has been described and shown in its entirety in FIG. 1 may advantageously be integrated in a production installation, to be precise such that a plurality of units containing lines 10, 11, on the one hand, and an intermediate store 12, on the other hand, are arranged one beside the other, a special feature being that the pallet conveyor 28 supplies all the units. The most favorable layout here is one in which the lines 10, 11 are alternately formed on one side of the pallet conveyor 28 or the other and the intermediate store 12 is accommodated on the opposite side in each case.

LIST OF DESIGNATIONS

| | | | |
|---|---|---|---|
| 10 | Line | 44 | Bracket |
| 11 | Line | 45 | Lifting unit |
| 12 | Intermediate store | 46 | Rack |
| 13 | Maker | 47 | Lifting head |
| 14 | Packer | 48 | Reel conveyor |
| 15 | Cellophane packer | 49 | Running rail |
| 16 | Multipacker | 50 | Travelling mechanism |
| 17 | Carton packer | 51 | Lifting cable |
| 18 | Reel | 52 | Winch |
| 18a | Cellophane reel | 53 | Reel carrier |
| 18b | Tin-foil reel | 54 | Securing lever |
| 18c | Collar reel | 55 | Conveying section |
| 18d | Filter-paper reel | 56 | Conveying section |
| 18e | Cigarette-paper reel | 57 | Depositing location |
| 19 | Central opening | 58 | Transverse section |
| 20 | Pallet | 59 | Intermediate conveyor |
| 21 | Rest | 60 | Reel platform |
| 22 | Base wall | 61 | Pallet path |
| 23 | Crosspiece | 62 | Material pallet |
| 24 | Rail | 63 | Blank |
| 25 | Transfer station | 64 | Laser sensor |
| 26 | Pallet carriage | 65 | Laser sensor |
| 27 | Lifting rail | 66 | Set-down panel |
| 28 | Pallet conveyor | 67 | Bearing |
| 29 | Travelling carriage | 68 | Load-bearing arm |
| 30 | Running rail | 69 | Reel magazine |
| 31 | Lifting mechanism | 70 | Supporting bar |
| 32 | Traction cable | 71 | Load-bearing panel |
| 33 | Securing means | 72 | Protrusion |
| 34 | Load-bearing strut | 73 | Toothed belt |
| 35 | Load-bearing leg | 74 | Guide rod |
| 36 | Winch | | |
| 37 | Intermediate store | | |
| 38 | Pallet platform | | |
| 39 | Portal robot | | |
| 40 | Support | | |
| 41 | Load-bearing member | | |
| 42 | Crossmember | | |
| 43 | Roller | | |

What is claimed is:

1. Arrangement for supplying production and packaging machines with expendable material or packaging material that are wound as reels (18), supplied on pallets (20) and distributed to the production and packaging machines, characterized by the following features:

a) a machine comprising at least two lines (10, 11) for producing and packaging cigarettes, b) an intermediate store (12) for storing packaging material reels (18) located adjacent to the machine and containing at least one pallet (20) of packaging material reels for processing in the machine, c) a pallet conveyor (28) for conveying pallets (20) on which one type of reel (18) is present to the intermediate store (12), and d) a reel conveyor (48) for transporting individual reels of the one type of reel (18) from the intermediate store (12) to the machine that is to be supplied with the reel (18), wherein the pallet conveyor (28) and the reel conveyor (48) are separate devices, and the conveying of the pallets (20) to the intermediate store (12) and the transporting of the individual reels (18) take place independently from one another.

2. Arrangement according to claim 1, characterized in that the pallets (20) are transported within the intermediate store (12) by a separate pallet carriage (26) conveyor.

3. Arrangement according to claim 1, characterized in that, in order to be received by the reel conveyor (48), reels (18) are transported within the intermediate store (12) by a separate portal robot (39) conveyor that can be moved above the pallets (20) with reels (18) positioned within the intermediate store (12) and that has an automatically controllable lifting head (47) for lifting reels (18).

4. Arrangement according to claim 2, characterized in that, in order to be received by the reel conveyor (48), reels (18) are transported within the intermediate store (12) by a separate portal robot (39) conveyor that is moved above the pallets (20) with reels (18) positioned within the intermediate store (12) and that has an automatically controllable lifting head (47) for lifting reels (18).

5. Arrangement according to claim 1, characterized in that formed within or directly adjacent to the intermediate store (12) is a transfer station (25) within which the pallet conveyor (28) for feeding pallets (20) to the intermediate store (12) runs, wherein the pallet conveyor (28) sets down pallets (20) on the pallet carriage (26) and conveys empty pallets (20) away from within the transfer station (25).

6. Arrangement according to claim 1, characterized in that, in order to be received by the reel conveyor (48), reels (18) are set down by the portal robot (39) conveyor assigned to the intermediate store (12) at a precisely defined position in the movement path of the reel conveyor (48) such that the reel provided can be received by the reel conveyor (48) with minor control measures being taken.

7. Arrangement according to claim 6, characterized in that, in order to be received by the reel conveyor (48), reels (18) are set down by the portal robot (39) on a transfer or intermediate conveyor (59) and fed to the reel conveyor (48) by said transfer or intermediate conveyor for the reel (18) to be received within the transfer station (25).

8. Arrangement according to claim 6, characterized in that a rest for reels (18) is aligned with the reel conveyor (48) and comprises a load-bearing panel (71) with a centering means for the reel (18), the centering means being a protrusion (72) that passes into a central opening (19) of the reel (18).

9. Arrangement according to claim 7, characterized in that a rest for reels (18) is aligned with the reel conveyor (48) and comprises a load-bearing panel (71) with a centering means for the reel (18), the centering means being a protrusion (72) that passes into a central opening (19) of the reel (18).

10. Arrangement according to claim 1, characterized in that the pallet conveyor (28) is an overhead conveyor with a traveling carriage (29) that can be displaced along an elevated running rail (30) and on which there is arranged a lifting mechanism (31) for moving a securing means (33) for pallets (20) up and down, wherein a common pallet conveyor (28) is assigned to a plurality of intermediate stores (12) and is equipped with packaging material and/or pallets (20) within a common central store.

11. Arrangement according to claim 1, characterized in that the reel conveyor (48) is an open-ended overhead conveyor with a traveling mechanism (50), which can be displaced on an elevated running rail (49), and further characterized by a reel carrier (53), which can be moved up and down by a lifting means (51) and which receives at least a single reel (18).

12. Arrangement for supplying production and packaging machines with expendable material or packaging material that are wound as reels (18), supplied on pallets (20) and distributed to the production and packaging machines, characterized by the followign features:

a) a machine comprising at least two lines (10, 11) for producing and packaging cigarettes,
    b) an intermediate store (12) for storing packaging material reels (18) located adjacent to the machine and containing at least one pallet (20) of packaging material reels for processing in the machine,
    c) a pallet conveyor (28) for conveying pallets (20) on which one type of reel (18) is present to the intermediate store (12), and
    d) a reel conveyor (48) for transporting individual reels of the one type of reel (18) from the intermediate store (12) to the machine that is to be suppliedwith the reel (18),
    wherein
    the pallet conveyor (28) is designed as an overhead conveyor with a traveling carriage (29) that can be displaced along an elevated running rail (30) and on which there is arranged a lifting mechanism (31) for moving a securing means (33) for pallets (20) up and down,
    the pallet conveyor (28) is assigned to a plurality of intermediate stores (12) and is equipped with packaging material and/or pallets (20) in the region of a common central store,
    the pallet conveyor (28) and reel conveyor (48) run through the common transfer station (25) of the intermediate store (12) along parallel movement paths, and
    the reel conveyor (48) is guided through the transfer station (25) by way of a transverse section (58) which connects two conveying sections (55, 56) to one another.

13. Arrangement for supplying production and packaging machines with expendable material or packaging material, in particular material webs which are wound as reels (18), supplied on pallets (20) and distributed (individually) to the production and packaging machines, characterized by the following features:

a) a machine comprising at least two lines (10, 11) for producing and packaging cigarettes,
    b) an intermediate store (12) for storing packaging material reels (18) located adjacent to the machine and containing at least one pallet (20) of packaging material reels for processing in the machine,
    c) a pallet conveyor (28) for conveying pallets (20) on which one type of reel (18) is present to the intermediate store (12), and
    d) a reel conveyor (48) for transporting individual reels of the one type of reel (18) from the intermediate store (12) to the machine that is to be suppliedwith the reel (18),
    wherein
    the reel conveyor (48) is an open-ended overhead conveyor with a traveling mechanism (50), which can be displaced on an elevated running rail (49), and a reel carrier (53), which can be moved up and down by a lifting means (51) and is intended for receiving at least a single reel (18),
    the pallet conveyor (28) and reel conveyor (48) run through the common transfer station (25) of the intermediate store (12) along parallel movement paths, and
    the reel conveyor (48) is guided through the transfer station (25) by way of a transverse section (58) which connects two conveying sections (55, 56) to one another.

14. Arrangement according to claim 1, characterized in that the pallets (20) in the intermediate store (12) are positioned on stationary rests (21), located in two rows on both sides of a central movement path of a pallet carriage (26) for transporting pallets (20) between the transfer station (25) and the associated rest (21).

15. Arrangement according to claim 14, characterized in that incoming pallets (20) can be set down on the pallet carriage (26) within the transfer station (25) by the pallet conveyor (28) and fed to the rests (21) by the pallet carriage (26).

16. Arrangement according to claim 14, characterized in that the pallet carriage (26) has a transverse conveying arrangement for transferring pallets (20) to rests (21).

* * * * *